(12) United States Patent
Lo

(10) Patent No.: US 7,997,141 B1
(45) Date of Patent: Aug. 16, 2011

(54) OIL PRESSURE SENSOR

(76) Inventor: Jui-Yang Lo, Junghe (TW)

( * ) Notice: Subject to any disclaimer, the term of this patent is extended or adjusted under 35 U.S.C. 154(b) by 36 days.

(21) Appl. No.: 12/692,624

(22) Filed: Jan. 24, 2010

(51) Int. Cl.
*G01L 7/00* (2006.01)
(52) U.S. Cl. .......................................... 73/706
(58) Field of Classification Search .................. None
See application file for complete search history.

(56) References Cited

U.S. PATENT DOCUMENTS

| | | | | |
|---|---|---|---|---|
| 4,551,069 | A * | 11/1985 | Gilmore | 417/13 |
| 6,425,293 | B1 * | 7/2002 | Woodroffe et al. | 73/756 |
| 6,938,490 | B2 * | 9/2005 | Wagner et al. | 73/708 |
| 2002/0029639 | A1 * | 3/2002 | Wagner et al. | 73/756 |
| 2003/0150275 | A1 * | 8/2003 | Wagner et al. | 73/715 |

* cited by examiner

*Primary Examiner* — Andre J Allen
(74) *Attorney, Agent, or Firm* — Ming Chow; Sinorica, LLC

(57) ABSTRACT

A novel oil pressure sensor includes component parts simply stacked up from bottom to top, namely a main body, a separator, an induction unit, a press board, an electronic circuit and a lid. The main body has an accommodation cavity to accommodate other component parts. An oil inlet pipe which extended downward from the accommodation cavity is covered by the separator to alleviate the impact of the flowing oil to the component parts. A conduction medium filled between the induction unit and the separator contributes to assuring conductance of the oil pressure thereby upgrading measurement sensitivity. The press board contributes to prevention of oil leakage. The electronic circuit sends the measured data to another instrument by simple and reliable plug and receptacle combination.

6 Claims, 5 Drawing Sheets

OIL PRESSURE SENSOR

BACKGROUND OF THE INVENTION

1. Field of the Invention

The present invention relates to an oil pressure sensor and more particularly an oil pressure sensor which is simply constructed, of high precision, invulnerable to be securely applicable to measure oil pressure in all occasions.

2. Description of the Prior Art

There are two types of conventional oil pressure sensors, one is the ceramic type and the other the mechanical type.

(1) The ceramic type is made of ceramic material by precision technology. As the ceramic material has several advantages like stable in property, electrically insulative, better rigidity and resistive to abrasion, the ceramic type oil pressure sensor is thus of better accuracy, and durable. However, its fabrication process is complicated with the result of high production cost and expensive market price.

(2) The mechanical type is manufactured according to the traditional mechanical procedure. It is advantageous with simple in construction, easy for production and the market price is lower than that of an equivalent ceramic one. As a result, it has been occupying a wider market than the ceramic type. However, the latter is rather inferior to the former in measurement accuracy, and vulnerable, yielding to abrasion after long time use that further leads to aggravating the measurement accuracy, and even breaking down the sensor. Further to this, the mechanical type is bulky, awkward and not so convenient to use.

For these shortcomings inherent to the prior art, an improvement is seriously required.

In a bid to rectify the present situation described above, the inventor of the present invention has plunged into this matter with great effort for years for studying how to solve the existing problems, and finally come up with a novel type of an oil pressure sensor which will be disclosed below.

SUMMARY OF THE INVENTION

It is an object of the present invention to provide an oil pressure sensor which is simply constructed, easy for production and assembly with low cost.

It is another object of the present invention to provide an oil pressure sensor which is compact in size, easy to install and use in every occasion with high precision.

It is one more object of the present invention to provide an oil pressure sensor which can be securely and durably used for a long time without leaking oil or malmeasurement or even incurring an accident so as to release the user's worry.

To achieve these and other objects mentioned above, the oil pressure sensor provided by the present invention comprises a main body baying an accommodation cavity in it. An oil inlet pipe is extended downwards from the accommodation cavity to introduce the oil whose pressure is to be measured into the accommodation cavity through the oil inlet pipe. A separator is provided in the accommodation cavity to cover the oil inlet pipe in order not to allow the oil pressure directly impact other construction parts of the sensor. An induction unit is disposed on the separator with an induction element attached to it downwardly facing the separator so as to detect the oil pressure. There is a conduction medium filled between the induction unit and the separator for assuring the conduction of oil pressure thereby upgrading the measurement sensitivity of the oil pressure by the induction unit. A press board is lay on the induction unit so as to enhance hermetical effect of the induction unit thereby preventing oil leakage and improving the accuracy of measurement. On the press board there is an electronic circuit whose circumference is electrically in connection with the induction unit so as to actuate the induction unit and send back the measured data. Finally the electronic circuit is covered with a lid so as to seal the accommodation cavity in the main body. An opening is formed through the lid to bring lead wires of the electronic circuit to go out therefrom for transmitting the measured data to another instrument.

DETAILED DESCRIPTION OF THE PREFERRED EMBODIMENT

Figure 1:
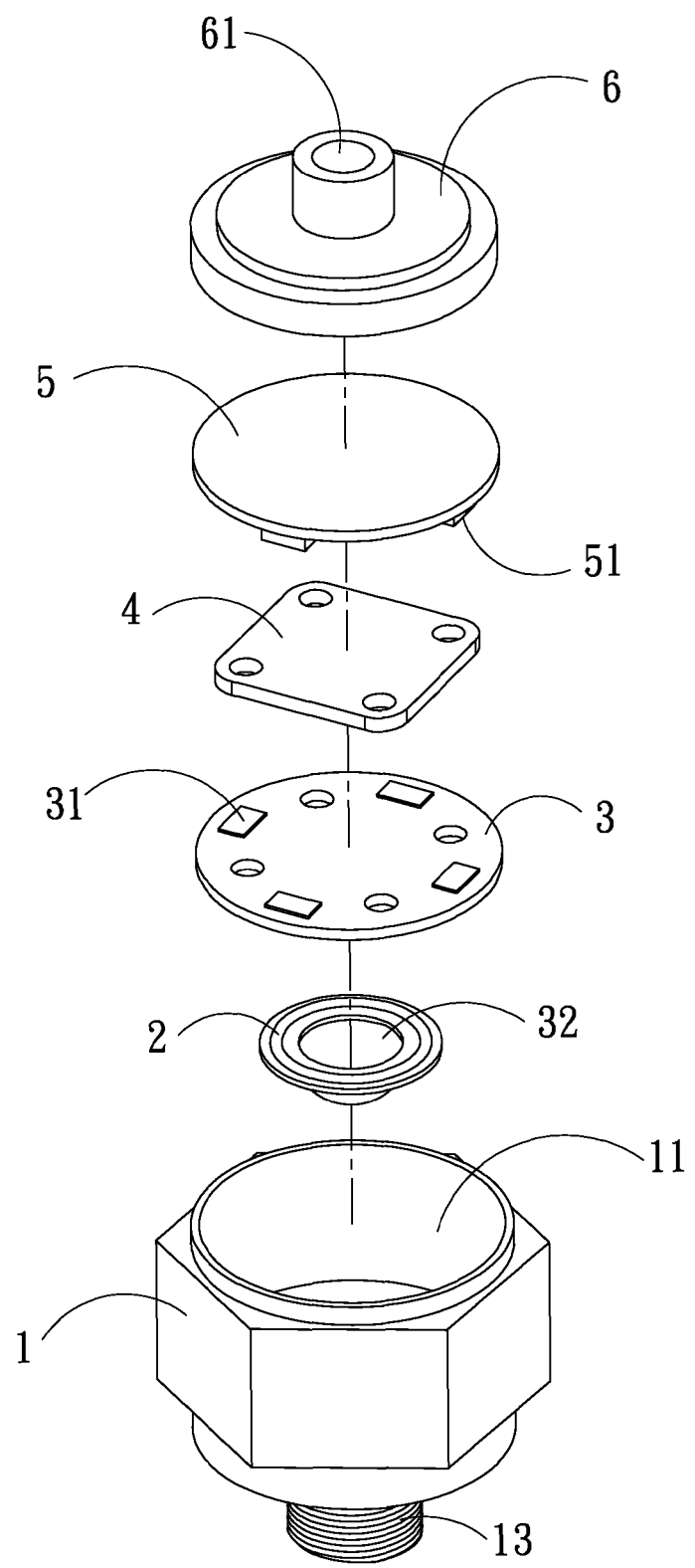
FIG. 1 is a three dimensional exploded view of the oil pressure sensor according to the present invention.
Figure 2:
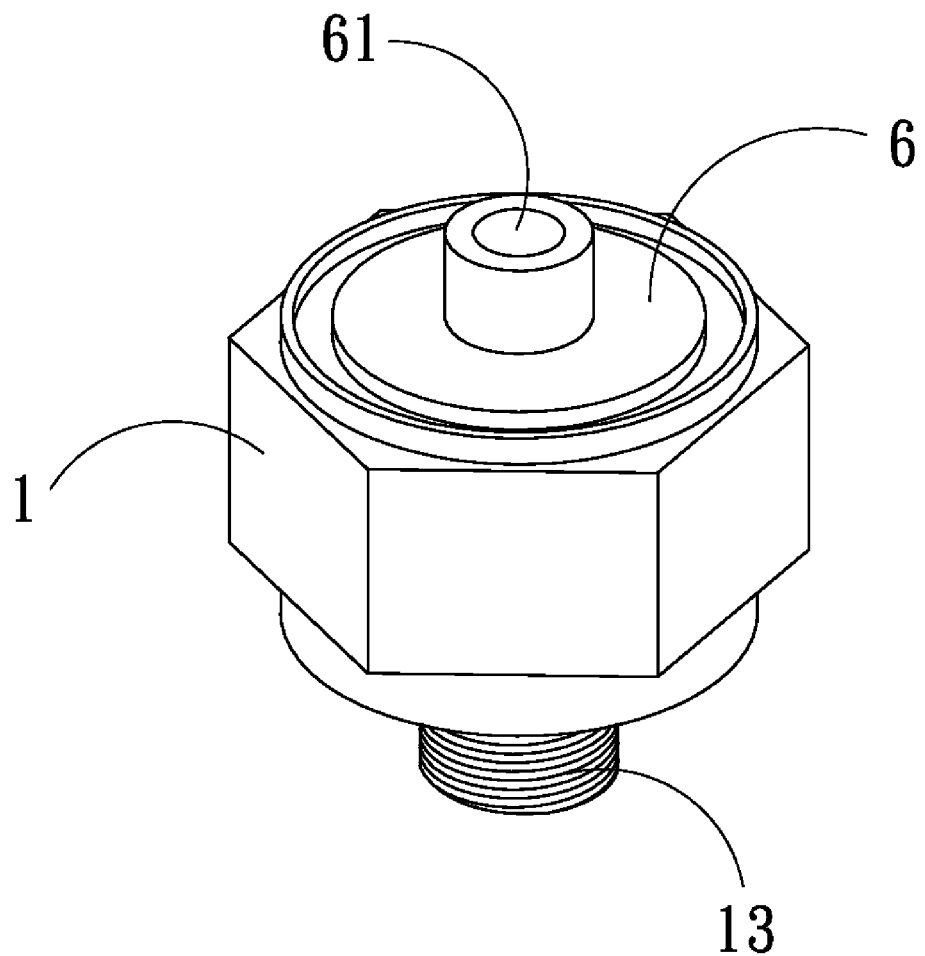
FIG. 2 is perspective view of the oil pressure sensor according to the present invention.
Figure 3:
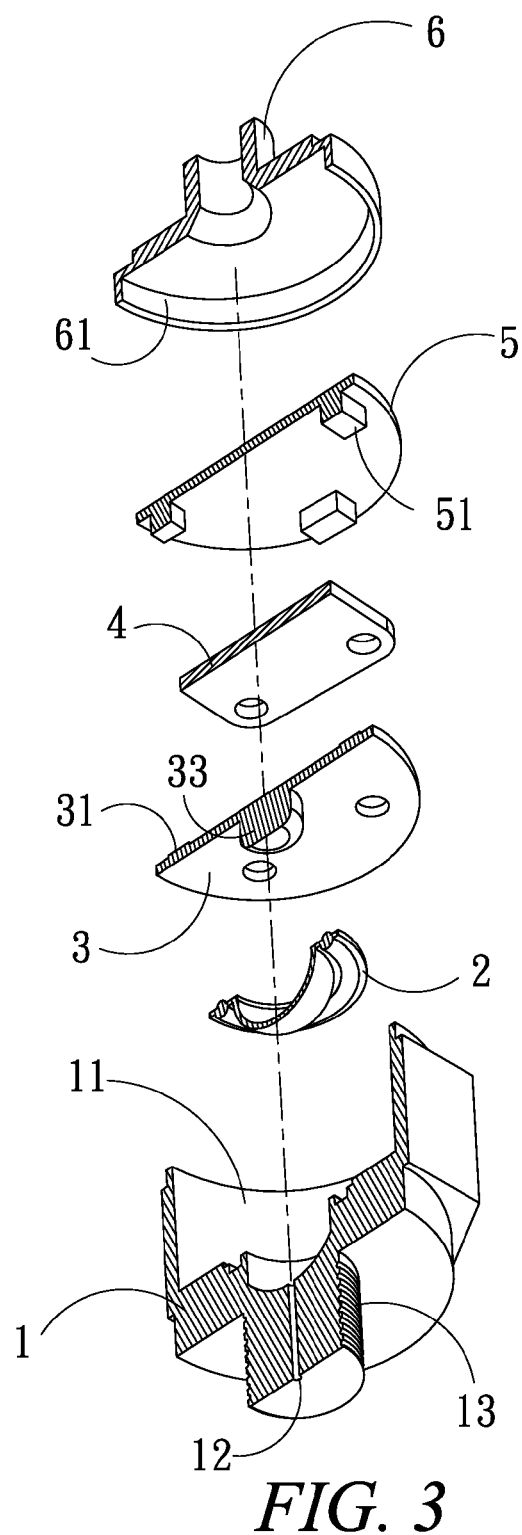
FIG. 3 is a fragmentary exploded view for illustrating the oil pressure sensor of the present invention.
Figure 4:
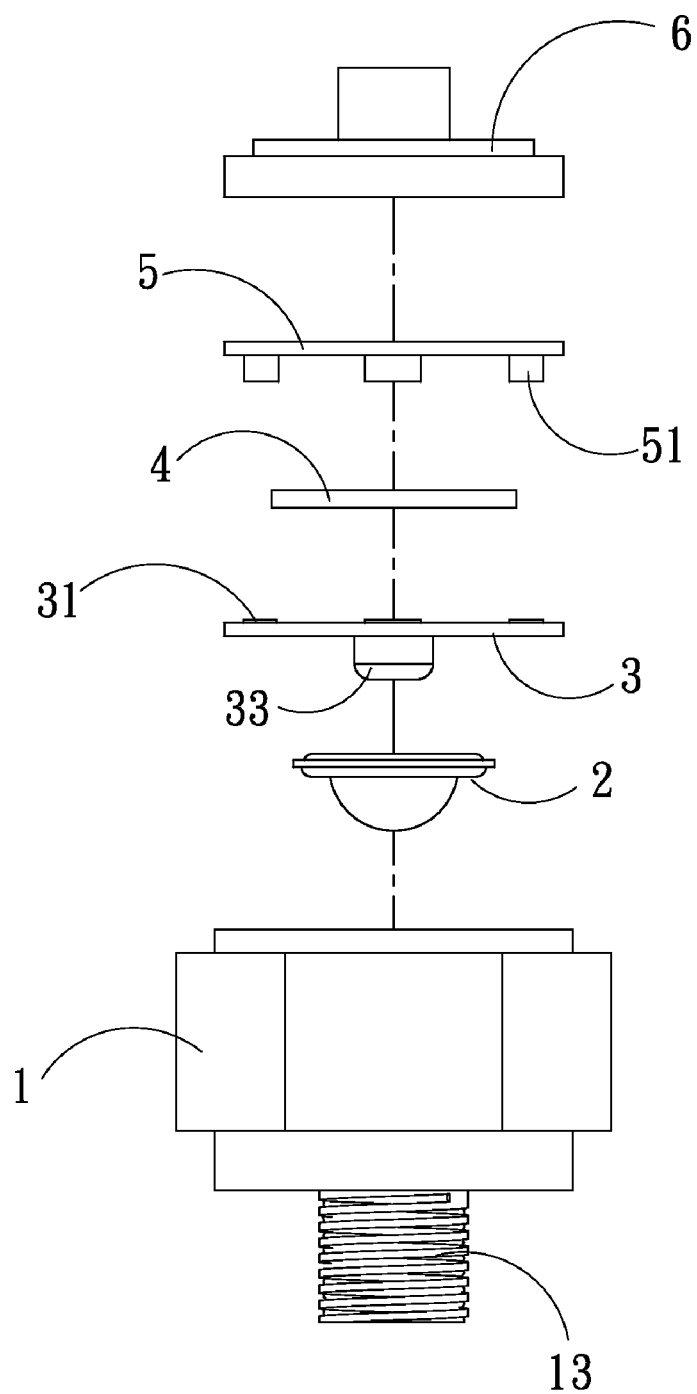
FIG. 4 is an exploded front view of the oil pressure sensor according to the present invention.
Figure 5:
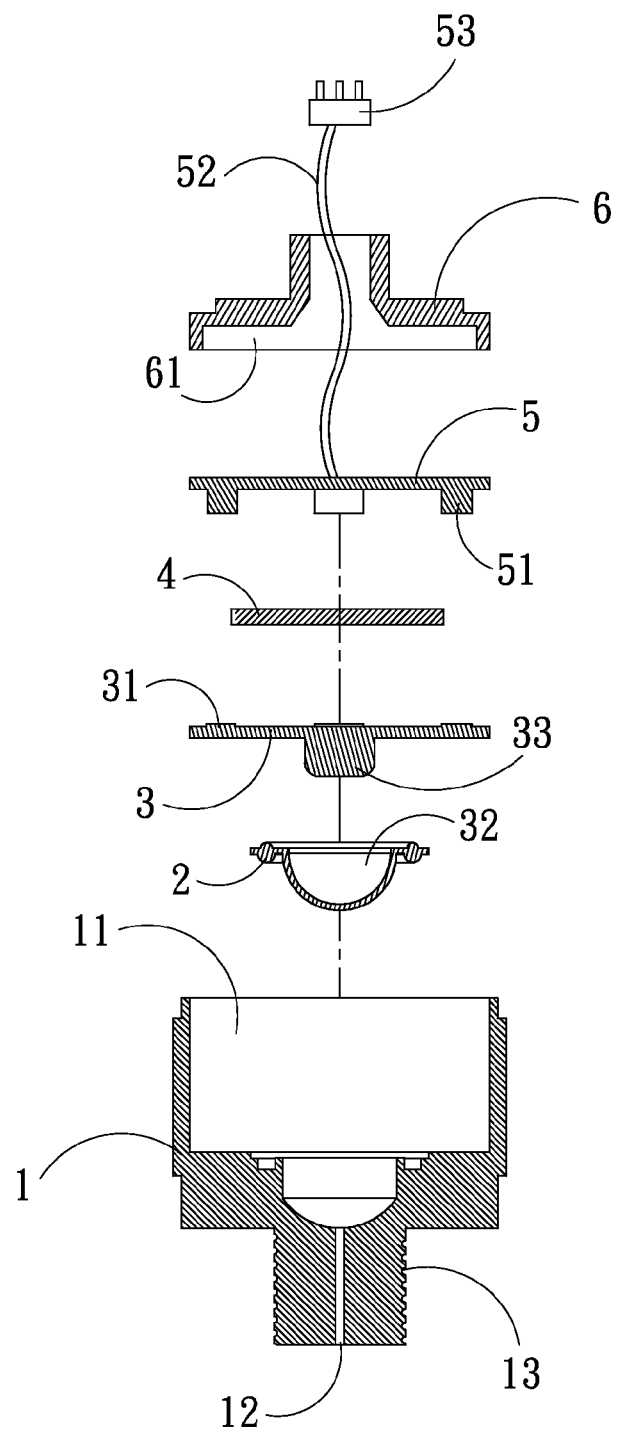
FIG. 5 is a fragmentary exploded front view of the oil pressure sensor according to the present invention.

Referring to FIG. 1 through FIG. 5, the oil pressure sensor provided by the present invention comprises a main body 1, a separator 2, an induction unit 3, a press board 3, an electronic circuit 5 and a lid 6.

The main body 1 has an accommodation cavity 11 in it to accommodate other component parts of the oil pressure sensor. An oil inlet pipe 12 is extended downwards from the accommodation cavity 11 to introduce the oil whose pressure is to be measured into the accommodation cavity 11 via oil inlet pipe 12. The separator 2 is provided in the accommodation cavity 11 to cover the oil inlet pipe 12 in order not to allow the oil pressure directly impact other component parts of the sensor. The separator 2 is essentially made of a rubber element of fluoroelastomer. The induction unit 3 is disposed on the separator 2 with an induction element 33 attached to it and downwardly facing to the separate 2 so as to detect the oil pressure. There is a conduction medium 32 filled between the induction unit 3 and the separator 2 for assuring the conduction of the oil pressure thereby upgrading the measurement sensitivity of the oil pressure by the induction unit 3. The press board 4 is lay on the induction unit 3 so as to enhance hermical effect of the induction unit 3 thereby preventing oil leakage and improving the accuracy of measurement. The electronic circuit 5 is formed on the press board 4. There are electric conducting segments 31, 51 along the circumference of the induction unit 3 and the electronic circuit 5 so as to electrically connect the two component parts via electric conduction segments 51 and 31 thereby actuating the induction unit 3 and sending back the measured data. The electronic circuit 5 is covered with the lid 6 so as to seal the accommodation cavity 11 in the main body 1 thus making up an independent structure. An opening 61 is formed through the lid 6 to bring lead wires 52 of the electronic circuit 5 to stretch out therefrom to another instrument for transmission of measured data. Moreover, the lead wires 52 are provided with terminals 53 which are connected with another instrument by plug and receptacle combination for the convenience of transmitting the measured data to another instrument with a simple connection structure.

With such a structure, when the oil pressure sensor is to be set for measurement, the main body 1 of the sensor is screwed into the measuring object by means of its threaded face 13. The oil for measurement is introduced into the accommodation cavity 11 via oil inlet pipe 12 and its flow is retarded and alleviated by the separator 2 and the conduction medium 31 such that the induction unit 3 can carry out measurement of the oil pressure with its induction element 33. The hermetical effect of the main body 1 is enhanced by the press board 4 so that the operation security is assured. The measured data are sent to other instruments via electronic circuit 5 and the lead wires 52.

The oil pressure sensor fabricated according to the present invention has several advantages in comparison with both ceramic and mechanical type ones, namely:

1. The instrument precision is greatly improved.
2. This instrument is suitable for all kinds of oil pressure measurement.
3. The mechanical structure is compact and simple so that the production cost is inexpensive.
4. Free from an accidental oil leakage, 100% security can be assured.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An oil pressure sensor comprising:
   a main body having an accommodation cavity therein, wherein an oil inlet pipe is extended downwards from said accommodation cavity;
   a separator provided in said accommodation cavity to cover said oil inlet pipe in order not to allow the oil pressure directly impact other component parts;
   an induction unit disposed on said separator with an induction element attached thereto and downwardly facing to said separator so as to detect the oil pressure; wherein a conduction medium is filled between said induction unit and said separator for assuring conduction of the oil pressure thereby upgrading a measurement sensibility of the oil pressure by said induction unit;
   a press board lay on said induction unit so as to enhance hermical effect of said induction unit thereby preventing oil leakage and improving accuracy of measurement;
   an electronic circuit formed on said press board with its circumference electrically in connection with said induction unit thereby actuating said induction unit and sending back measured data; and
   a lid covering said electronic circuit so as to enclose the lid along with said main body in a sealed state; wherein an opening is formed through said lid to bring lead wires of said electronic circuit to stretch out therefrom to another instrument for transmitting measured data.

2. The sensor of claim 1, wherein said separator is made of a rubber element.

3. The sensor of claim 1, wherein said rubber element is a fluoroelastomer.

4. The sensor of claim 1, wherein said conduction medium is silicon oil.

5. The sensor of claim 1, wherein electric conduction segments are provided between said induction unit and said electronic circuit to make the two component parts electrically in connection with each other.

6. The sensor of claim 1, wherein said lead wires are provided with terminals which are connected with another instrument by plug and receptacle combination for transmitting the measured data to another instrument.

* * * * *